(12) United States Patent
MacFaden

(10) Patent No.: US 10,116,515 B2
(45) Date of Patent: Oct. 30, 2018

(54) BINDING APPLICATION COMMUNICATION PORTS TO DYNAMIC SUBSETS OF NETWORK INTERFACES

(71) Applicant: VMware, Inc., Palo Alto, CA (US)

(72) Inventor: Michael MacFaden, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 221 days.

(21) Appl. No.: 15/169,341

(22) Filed: May 31, 2016

(65) Prior Publication Data

US 2017/0346859 A1    Nov. 30, 2017

(51) Int. Cl.
| | |
|---|---|
| *G06F 15/16* | (2006.01) |
| *H04L 12/24* | (2006.01) |
| *H04L 29/06* | (2006.01) |
| *H04L 12/26* | (2006.01) |
| *H04L 29/08* | (2006.01) |

(52) U.S. Cl.
CPC .......... *H04L 41/12* (2013.01); *H04L 43/0811* (2013.01); *H04L 67/10* (2013.01); *H04L 69/26* (2013.01)

(58) Field of Classification Search
CPC ..... H04L 41/12; H04L 43/0811; H04L 67/10; H04L 69/26
USPC .................................................. 709/227, 203
See application file for complete search history.

(56) References Cited

U.S. PATENT DOCUMENTS

| | | | | | |
|---|---|---|---|---|---|
| 5,966,663 | A | * | 10/1999 | Gleason ................. | H04L 29/06 455/412.1 |
| 6,512,768 | B1 | * | 1/2003 | Thomas ................. | H04L 45/02 370/235 |
| 2003/0041141 | A1 | * | 2/2003 | Abdelaziz ............. | G06F 9/4416 709/223 |
| 2003/0187974 | A1 | * | 10/2003 | Burbeck ............. | H04L 12/1863 709/224 |
| 2007/0005808 | A1 | * | 1/2007 | Day ...................... | H04L 41/145 709/248 |
| 2008/0172482 | A1 | * | 7/2008 | Shah ................... | H04L 41/0213 709/223 |
| 2016/0344830 | A1 | * | 11/2016 | Smith ...................... | F24F 11/30 |

* cited by examiner

*Primary Examiner* — Frantz Jean
(74) *Attorney, Agent, or Firm* — Fish & Richardson P.C.

(57) ABSTRACT

Exemplary methods, apparatuses, and systems receive a request to bind a socket for a computer application to a tag. The tag is mapped to a network address for each of a subset of interfaces. The request identifies the computer application using a port number. The subset of interfaces includes one or more interfaces within the computer and less than all interfaces within the computer. An interface within the subset of interfaces receives a protocol data unit (PDU) including the port number included in the bind request and a destination address. The received PDU is delivered via the socket in response to resolving a mapping between the tag included in the bind request and the destination address of the PDU and further based upon determining the port number included in the bind request was included in the received PDU.

20 Claims, 2 Drawing Sheets

BINDING APPLICATION COMMUNICATION PORTS TO DYNAMIC SUBSETS OF NETWORK INTERFACES

FIELD OF THE INVENTION

The various embodiments described in this document relate to binding communication ports for one or more applications to one or more network interfaces. In particular, embodiments relate to binding application communication ports to dynamic subsets of network interfaces using network interface tags.

BACKGROUND OF THE INVENTION

An application running on a server, e.g., within a virtual machine, may use a socket to define the protocol for expected communications and bind the socket and service (commonly referred to as a port or by a port number) to a single or to all of the network interfaces available on the server. For example, each network interface may be assigned an Internet Protocol (IP) address. Communications received that are directed to the IP address and port number are placed in a buffer for or otherwise passed to the corresponding application.

Using Berkeley Software Distribution (BSD) sockets, an administrator or management software can use the bind system call to associate a port number and a socket for an application to a single interface IP address or to all interface IP addresses. The BSD sockets bind system call, however, does support binding to a subset of two or more, but less than all, interfaces. The bind system call also does not support binding to a dynamic subset of interfaces. Binding to all interfaces requires little management but is inefficient and insecure. For example, a service unrelated to management of a server may bind to an interface dedicated to management traffic. With the growing scale of interfaces in devices (e.g., in a host server providing a virtualized computing environment), the dynamic nature of interfaces (e.g., IP addresses being added, removed, or otherwise changing), and the separation of resources within a server for different services and/or tenants, binding to individual interfaces requires significant management. In particular, when an IP address is changed, added, or removed and the application is not bound to "all," the application may need to be restarted to update the binding to one or more new IP addresses.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

This document describes embodiments that bind application communication ports to dynamic subsets of network interfaces using network interface tags. In particular, embodiments are directed to receiving a request to bind a socket for a computer application to a tag. The tag is mapped to a network address for each of a subset of interfaces having zero or more network addresses. The request identifies the computer application using a port number and protocol. When an interface within the subset of interfaces receives a protocol data unit (PDU) including a destination address and the port number included in the bind request, the received PDU is delivered to the application via the socket in response to resolving a mapping between the tag included in the bind request and the destination address of the PDU and based upon determining the port number included in the bind request was included in the received PDU. As used within this document, a PDU refers to a unit of data transmitted according to a particular protocol. For example, a PDU may refer to a frame, a packet, etc. As a result of using a tag, a single bind request can be used to bind a socket for an application to a dynamic subset of interfaces. Binding to less than all interfaces enables containment of communications based upon tenants, functionalities, security, etc. Interfaces coming up, going down, or changing network addresses is managed in the mapping of the tag to interfaces and does not require restarting applications or rebinding sockets.

Figure 1:
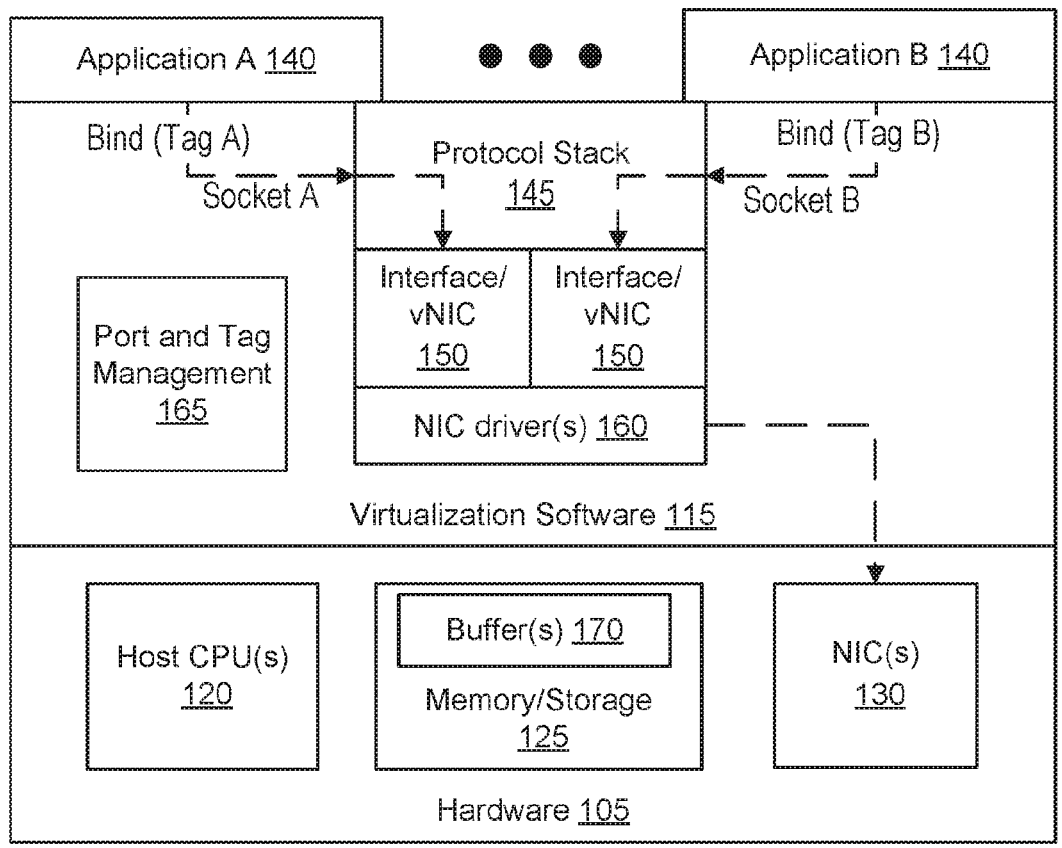
FIG. 1 illustrates, in block diagram form, an exemplary host computer to implement the binding of application communication ports to dynamic subsets of network interfaces using network interface tags.

FIG. 1 illustrates, in block diagram form, exemplary host 100 to implement the binding of application communication ports to dynamic subsets of network interfaces using network interface tags. Host 100 is a physical computer may also be referred to within this document as a computer and/or server. In one embodiment, host 100 provides centrally-managed user virtual desktops, such as those implemented by virtual machines (VMs), via one or more networks (e.g., a local area network or other private or publically accessible wide area network, such as the Internet).

Hardware 105 includes one or more processing devices (CPU(s)) 120, data storage and memory 125, and network interface controllers (NIC(s)) 130. Data storage and memory 125 may be used for storing data, metadata, and programs for execution by the processing device(s). Data storage and memory 125 may include one or more of volatile and non-volatile memories, such as Random Access Memory (RAM), Read Only Memory (ROM), a solid-state drive (SSD), Flash, Phase Change Memory (PCM), or other types of data storage, such as magnetic disk drives, optical disk drives, etc. The memory may be internal or distributed memory. One or more buses may be used to interconnect the various components of hardware 105. Additionally, the NIC(s) 130 may be used to connect host computer 100, via a wired or wireless network, with one another computer.

Virtualization software layer (or operating system layer, collectively referred to within this document as virtualization software layer) 115 runs on hardware 105 of host 100. Virtualization software layer 115 manages applications 140 and physical resources, such as hardware 105. Additionally, virtualization software layer 115 maintains virtual-to-physical hardware mappings. For example, virtualization software 115 may manage application access to CPU(s) 120, memory/storage 125, and/or NIC(s) 130. In one embodiment, one or more applications 140 enable an administrator and/or management platform to configure host 100, e.g., for manual and automated control of host 100, VMs, and hardware 105. For example, a management platform may instruct an application 140 to provision, configure, and maintain VMs as virtual desktops or network services, manage resources to run VMs, manage live migration of VMs, automate storage management workflows and provide access to storage objects, etc.

In one embodiment, virtualization software 115 provides one or more protocol stacks 145, virtual network interface controllers (vNICs) 150, and NIC driver(s) 160. Each vNIC 150 emulates a physical NIC such that each application 140 is able to communicate with virtually and physically networked devices (e.g., external storage, VMs 110, and other computers). NIC driver(s) 160 provide a software interface, e.g., between vNICs 150 and physical NIC(s) 130.

Virtualization software 115 includes one or more port and tag management agents 165. In one embodiment, one or more port and tag management agents 165 are kernel-level processes or otherwise functionality that is a part of the kernel. In one embodiment, port and tag management agent 165 maintains mappings between tags and virtual and/or physical interfaces and executes the binding of application communication ports to dynamic subsets of network interfaces using the network interface tags, e.g., as described with reference to FIG. 2. In one embodiment, port and tag management agent 165 creates a socket for an application 140 to allocate a buffer 170 and/or other resources for the application 140. After binding the socket and a port number for the application 140 to a subset of network addresses associated with vNIC(s) 150 and/or NIC(s) 130, communications addressed to the corresponding network address and port number are stored by management agent 165 in buffer 170. Port and tag management agent 165 alerts corresponding application 140 to the received communication and application 140 retrieves the communication from buffer 170.

For example, a system call may bind Application A 140, using Tag A and Socket A, to a first interface 150. Another system call may bind Application B 140, using Tag B and Socket B, to a second, different interface 150. Each interface 150, in turn, is associated with a set of network addresses. As a result of this use of tags in bind requests, two applications 140 can segregate their network traffic to different interfaces 150 while sharing a common protocol stack 145. As a result, applications 140 can securely bind to and monitor traffic on a controlled, dynamic subset of interfaces. Traffic related to each of, e.g., storage, VM management, etc. may be separately tagged and securely isolated without creating separate protocol stacks for each.

Additionally, while described with reference to a virtualization environment in host 100, port and tag management agent(s) 165 and buffers 170 as described in this document may also be implemented in other computing environments. For example, port and tag management agent(s) 165 may maintain mappings between tags and network interfaces and execute the binding of application communication ports to dynamic subsets of network interfaces using tags as described within this document in a server, computer, or other computing environment that does not include virtual machines.

Figure 2:
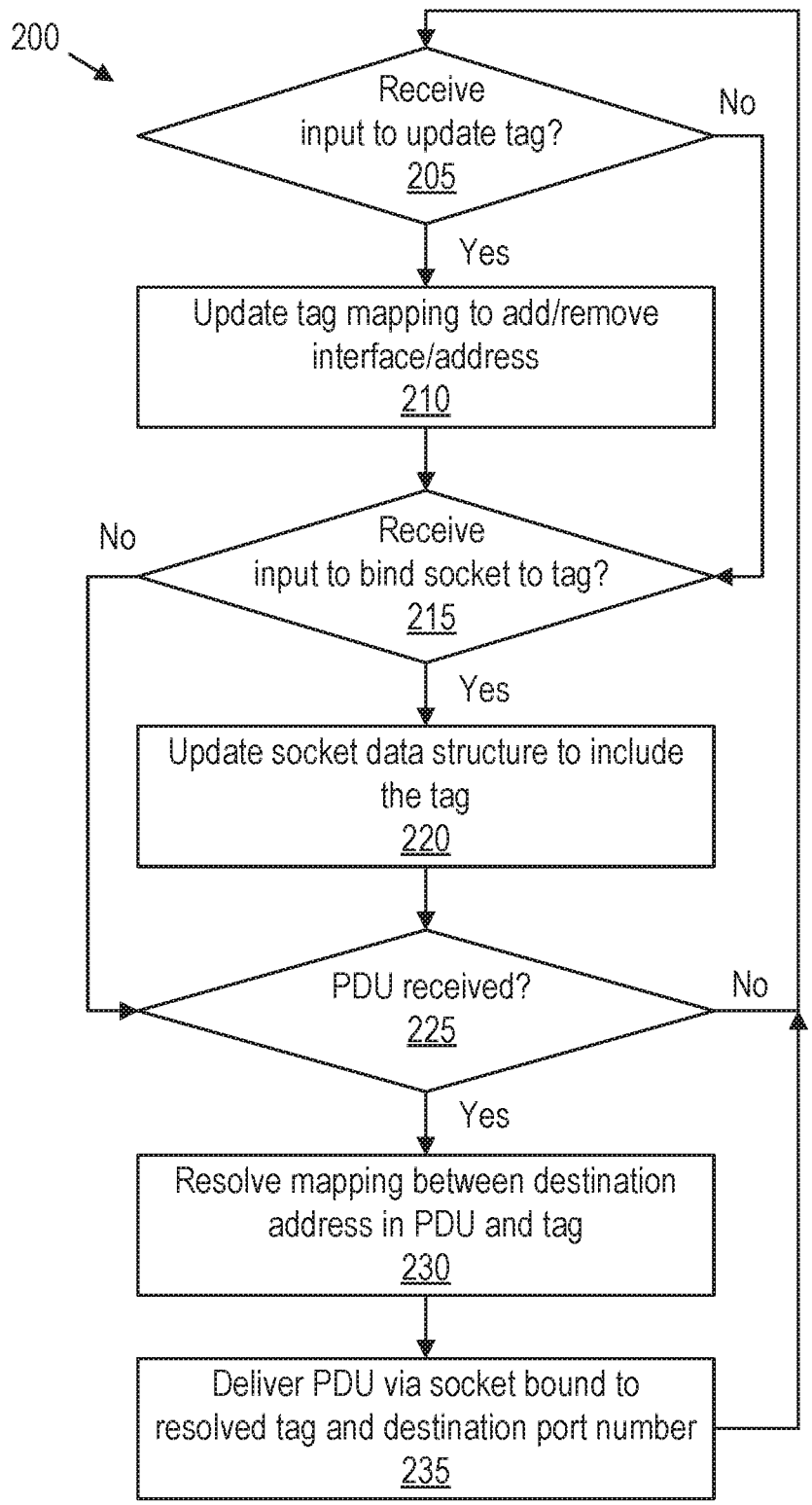
FIG. 2 is a flow chart illustrating an exemplary method of binding application communication ports to dynamic subsets of network interfaces using network interface tags.

FIG. 2 is a flow chart illustrating an exemplary method 200 of binding application communication ports to dynamic subsets of network interfaces using network interface tags. At block 205, management agent 165 determines if it has received input to create or update a network interface tag. For example, a subset of one or more network interfaces may be grouped under a common tag for a particular type of traffic, such as host management traffic, fault tolerance traffic, replication traffic, storage traffic, traffic isolated to a particular data center tenant, etc. Management agent 165 may receive an input identifying a network interface tag and a request to add or remove one or more network addresses (directly or indirectly by referencing network interfaces that include one or more network addresses) to an association with the network interface tag. In one embodiment, the one or more network interface addresses are Internet Protocol (IP) addresses. In one embodiment, the one or more network interface addresses represents a subset of interfaces within host 100, the subset including less than all of the interfaces within host 100. In one embodiment, host 100 implements multiple separate network protocol stacks and the subset includes less than all of the interfaces within a single network protocol stack 145 of host 100.

If management agent 165 has received input to create or update a network interface tag, at block 210, management agent 165 creates or updates a data structure for the tag to add or remove the network interface address(es) in response to the request. For example, management agent 165 adds the network interface address(es) to or removes the network interface address(es) from a list, table, or other data structure associated with the network interface tag.

At block 215, management agent 165 determines if it has received input to bind a socket to a network interface tag. For example, an application may create a socket in response to a request that includes a domain specifying a protocol family for the socket, a socket type, and/or a protocol to be used for the socket. In creating the socket, management agent 165 allocates a buffer 170 and/or other resources to facilitate network communication. An input to bind the socket may include, e.g., a reference to the socket, a network interface tag, and a port number.

If management agent 165 has received input to bind a socket to a network interface tag, at block 220, management agent 165 creates an association between the socket and the network interface tag. In one embodiment, management agent 165 creates the socket as a data structure including the received protocol family, socket type, and/or protocol. In response to the bind request, management agent 165 updates the data structure, or creates another, to add or otherwise associate the network interface tag and a port number included in the bind request with the socket.

At block 225, management agent 165 determines if a protocol data unit (PDU) has been received. For example, host 100 may receive a frame, packet, datagram, or other PDU at a NIC 130 or vNIC 150. In one embodiment, management agent 165 determines if a PDU has been received in response to a "listen" command as defined by BSD sockets or a similar command to prepare for incoming communications for the socket. If a PDU has not been received, method 200 returns to block 205 to further maintain tags and the binding of sockets to tags.

If a PDU has been received, at block 230, management agent 165 parses the PDU for a destination address and resolves a mapping between the destination address and a network interface tag. For example, management agent 165 performs a lookup or search of network interface tag data structures to identify a tag associated with the destination address.

At block 235, management agent 165 delivers the PDU via a socket. For example, management agent 165 further parses the PDU for a destination port number. In response to resolving a mapping between the destination address of the PDU and a tag, and in response to determining the port number included in the received PDU was a part of a bind request along with the tag, management agent 165 places the received PDU in the buffer allocated to the socket bound to the tag and port number. Management agent 165 alerts the computer application corresponding to the socket about the received PDU being placed in the buffer and the computer application service retrieves the PDU from the buffer.

Method 200 continues by returning to block 205 to continue maintaining network interface tags and binding sockets to tags. While method 200 is described and illustrated in a particular order, the functionality described may be performed in a different order. For example, one or more network interfaces may be added to or removed from a tag after binding a socket to the tag. Additionally, portions of method 200 may be performed in parallel.

As a result of binding a socket to a tag, adding a network interface address to or removing a network interface address from the tag does not trigger a need to update the binding of the socket. Additionally, adding a network interface address to or removing a network interface address from the tag does not trigger a need to restart the computer application. The socket remains bound to the tag, the application continues to run, and the dynamic nature of network addresses is managed by maintaining the mapping of the tag to network interface addresses. Furthermore, a single bind request is all that is needed to bind a socket to a limited subset of network interface addresses. The use of tags to bind sockets set forth in this document enables a safe and efficient segregation of network traffic, even within a single protocol stack 145 (e.g., when multiple network interfaces share a common protocol stack 145 but are associated with different network interface tags).

It will be apparent from this description that aspects of the inventions may be embodied, at least in part, in software. That is, the computer-implemented method 200 may be carried out in a computer system or other data processing system, such as host 100, in response to its processor executing sequences of instructions contained in a memory or other non-transitory machine-readable storage medium. The software may further be transmitted or received over a network (not shown) via a network interface. In various embodiments, hardwired circuitry may be used in combination with the software instructions to implement the present embodiments. It will also be appreciated that additional components, not shown, may also be part of host 100, and, in certain embodiments, fewer components than that shown in FIG. 1 may also be used in host 100.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory computer-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses distinct name spaces to isolate the containers from each other and therefore provides operating-system level segregation of the different groups of applications that operate within different containers. This segregation is akin to the VM segregation that is offered in hypervisor-virtualized environments, and thus can be viewed as a form of virtualization that isolates different groups of applications that operate in different containers. Such containers are more lightweight than VMs.

It should be recognized that while the specification refers to VMs, the examples given could be any type of DCNs, including physical hosts, VMs, non-VM containers, and hypervisor kernel network interface modules. In fact, the example networks could include combinations of different types of DCNs in some embodiments.

In the foregoing specification, the invention has been described with reference to specific exemplary embodiments thereof. Various embodiments and aspects of the invention(s) are described with reference to details discussed in this document, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Additionally, as used in this document, the term "exemplary" refers to embodiments that serve as simply an example or illustration. The use of exemplary should not be construed as an indication of preferred examples. Blocks with dashed borders (e.g., large dashes, small dashes, dot-dash, dots) are used to illustrate optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described in this document may be performed with fewer or more features/blocks or the features/blocks may be performed in differing orders. Additionally, the methods described in this document may be repeated or performed in parallel with one another or in parallel with different instances of the same or similar methods.

What is claimed is:

1. A computer-implemented method, comprising:
receiving a request from a computer application to bind a socket to a tag, wherein:
the computer contains a set of all interfaces and the tag is mapped to a network address for each of a subset of the set of all interfaces within a computer,
the request identifies the computer application using a port number, and
the subset of interfaces includes one or more interfaces within the set of all interfaces and less than all interfaces within the set of all interfaces;
storing an association between the socket and the tag to execute bind request;
receiving, at an interface within the subset of interfaces, a protocol data unit (PDU) including the port number included in the bind request and a destination address; and
delivering the received PDU via the socket in response to:
resolving a mapping between the tag included in the bind request and the destination address of the PDU, and
determining the port number included in the bind request was included in the received PDU.

2. The computer-implemented method of claim 1, further comprising:
receiving a request to map the destination address to the tag; and
updating a data structure to map the destination address to the tag.

3. The computer-implemented method of claim 2, wherein the destination address is mapped to the tag after receiving the request to bind the socket to the tag.

4. The computer-implemented method of claim 1, wherein adding a network address to or removing a network address from the mapping to the tag does not trigger a need to update the binding of the socket.

5. The computer-implemented method of claim 1, wherein adding a network address to or removing a network address from the mapping to the tag does not trigger a need to restart the computer application.

6. The computer-implemented method of claim 1, wherein delivering the received PDU via the socket includes placing the received PDU in a buffer and alerting the computer application about the received PDU.

7. The computer-implemented method of claim 1, wherein multiple interfaces share a common protocol stack and each of the multiple interfaces is associated with a unique tag to segregate network traffic between the plurality of interfaces.

8. A non-transitory computer-readable medium storing instructions, which when executed by a processing device, cause the processing device to perform a method comprising:
receiving a request from a computer application to bind a socket to a tag, wherein:
the computer contains a set of all interfaces and the tag is mapped to a network address for each of a subset of the set of all interfaces within a computer,
the request identifies the computer application using a port number, and
the subset of interfaces includes one or more interfaces within the set of all interfaces and less than all interfaces within the set of all interfaces;
storing an association between the socket and the tag to execute bind request;
receiving, at an interface within the subset of interfaces, a protocol data unit (PDU) including the port number included in the bind request and a destination address; and
delivering the received PDU via the socket in response to:
resolving a mapping between the tag included in the bind request and the destination address of the PDU, and
determining the port number included in the bind request was included in the received PDU.

9. The non-transitory computer-readable medium of claim 8, the method further comprising:
receiving a request to map the destination address to the tag; and
updating a data structure to map the destination address to the tag.

10. The non-transitory computer-readable medium of claim 9, wherein the destination address is mapped to the tag after receiving the request to bind the socket to the tag.

11. The non-transitory computer-readable medium of claim 8, wherein adding a network address to or removing a network address from the mapping to the tag does not trigger a need to update the binding of the socket.

12. The non-transitory computer-readable medium of claim 8, wherein adding a network address to or removing a network address from the mapping to the tag does not trigger a need to restart the computer application.

13. The non-transitory computer-readable medium of claim 8, wherein delivering the received PDU via the socket includes placing the received PDU in a buffer and alerting the computer application about the received PDU.

14. The non-transitory computer-readable medium of claim 8, wherein multiple interfaces share a common protocol stack and each of the multiple interfaces is associated with a unique tag to segregate network traffic between the plurality of interfaces.

15. An apparatus comprising:
a processing device; and
a memory coupled to the processing device, the memory storing instructions which, when executed by the processing device, cause the apparatus to:
receive a request from a computer application to bind a socket to a tag, wherein:
the computer contains a set of all interfaces and the tag is mapped to a network address for each of a subset of the set of all interfaces within a computer,
the request identifies the computer application using a port number, and
the subset of interfaces includes one or more interfaces within the set of all interfaces and less than all interfaces within the set of all interfaces;
storing an association between the socket and the tag to execute bind request;
receive, at an interface within the subset of interfaces, a protocol data unit (PDU) including the port number included in the bind request and a destination address; and
deliver the received PDU via the socket in response to:
resolving a mapping between the tag included in the bind request and the destination address of the PDU, and
determining the port number included in the bind request was included in the received PDU.

16. The apparatus of claim 15, wherein the instructions further cause the apparatus to:
  receive a request to map the destination address to the tag; and
  update a data structure to map the destination address to the tag.

17. The apparatus of claim 16, wherein the destination address is mapped to the tag after receiving the request to bind the socket to the tag.

18. The apparatus of claim 15, wherein adding a network address to or removing a network address from the mapping to the tag does not trigger a need to update the binding of the socket.

19. The apparatus of claim 15, wherein adding a network address to or removing a network address from the mapping to the tag does not trigger a need to restart the computer application.

20. The apparatus of claim 15, wherein the receiving interface is a virtual network interface controller.

* * * * *